United States Patent
Zheng et al.

(10) Patent No.: US 10,946,341 B2
(45) Date of Patent: Mar. 16, 2021

(54) BIPOLAR ELECTRODIALYSIS METHODS AND SYSTEMS

(71) Applicant: GENERAL ELECTRIC COMPANY, Schenectady, NY (US)

(72) Inventors: Yongchang Zheng, Watertown, MA (US); John H. Barber, Guelph (CA)

(73) Assignee: BL TECHNOLOGIES, INC., Minnetonka, MN (US)

( * ) Notice: Subject to any disclaimer, the term of this patent is extended or adjusted under 35 U.S.C. 154(b) by 269 days.

(21) Appl. No.: 15/580,989

(22) PCT Filed: Jun. 11, 2015

(86) PCT No.: PCT/US2015/035254
§ 371 (c)(1),
(2) Date: Dec. 8, 2017

(87) PCT Pub. No.: WO2016/200387
PCT Pub. Date: Dec. 15, 2016

(65) Prior Publication Data
US 2018/0154312 A1    Jun. 7, 2018

(51) Int. Cl.
*B01D 61/44* (2006.01)
*B01D 61/48* (2006.01)
*B01D 61/50* (2006.01)

(52) U.S. Cl.
CPC ......... *B01D 61/445* (2013.01); *B01D 61/485* (2013.01); *B01D 61/50* (2013.01)

(58) Field of Classification Search
CPC ..... B01D 61/445; B01D 61/50; B01D 61/485
See application file for complete search history.

(56) References Cited

U.S. PATENT DOCUMENTS

| 5,198,086 A | 3/1993 | Chlanda et al. |
| 5,281,318 A | 1/1994 | Tahara et al. |

(Continued)

FOREIGN PATENT DOCUMENTS

| CN | 1043089 A | 6/1990 |
| CN | 1103901 A | 6/1995 |

(Continued)

OTHER PUBLICATIONS

International Patent Application No. PCT/US2015/035254, International Preliminary Report on Patentability dated Dec. 21, 2017.

(Continued)

*Primary Examiner* — Arun S Phasge

(57) ABSTRACT

A bipolar membrane electrodialysis method and system are described for purifying an organic acid from an aqueous solution containing the salt of the organic acid. The system includes a bipolar membrane electrodialysis stack that includes at least one three-compartment bipolar membrane electrodialysis cell and at least one two-compartment bipolar membrane electrodialysis cell. The method includes recirculating the solution of organic acid produced from the three-compartment bipolar membrane electrodialysis cell and two-compartment bipolar membrane electrodialysis cell. Cation or anion exchange resins may be included in the spacers of acid compartment to increase the conductivity of acid compartments, thereby increasing current density of the bipolar electrodialysis stack and decreasing power consumption.

15 Claims, 4 Drawing Sheets

(56) References Cited

U.S. PATENT DOCUMENTS

| | | | |
|---|---|---|---|
| 5,294,316 A | 3/1994 | Schmidt et al. | |
| 5,702,579 A | 12/1997 | Veits et al. | |
| 6,331,236 B1 * | 12/2001 | Mani | B01D 61/44 204/525 |

FOREIGN PATENT DOCUMENTS

| | | |
|---|---|---|
| CN | 1155544 A | 7/1997 |
| CN | 1261817 A | 8/2000 |
| JP | H04501978 A | 4/1992 |
| JP | H07171353 A | 7/1995 |
| JP | H07507598 A | 8/1995 |
| JP | H09202984 A | 8/1997 |
| JP | 2002507148 A | 3/2002 |
| JP | 2003285070 A | 10/2003 |
| JP | 2007007655 A | 1/2007 |
| JP | 2008214662 A | 9/2008 |
| TW | 201335077 A | 9/2013 |
| WO | 9006168 A1 | 6/1990 |
| WO | 9900178 A1 | 1/1999 |

OTHER PUBLICATIONS

International Patent Application No. PCT/US2015/035254, International Search Report and Written Opinion dated Mar. 21, 2016.
Japanese Patent Application No. 2018-517122, Office Action dated Feb. 12, 2019—English Translation Available.
Japanese Patent Application No. 2018-517122, Office Action dated Oct. 31, 2019—English Translation Available.
Taiwanese Patent Application No. TW105117641, Office Action and Search Report dated Jan. 30, 2020—English Translation Available.
Chinese Patent Application No. 201580080760.0, Office Action dated Jun. 24, 2020.

\* cited by examiner

BIPOLAR ELECTRODIALYSIS METHODS AND SYSTEMS

CROSS-REFERENCE TO RELATED APPLICATIONS

This application is a National Stage Entry of International Application No. PCT/US2015/035254, filed Jun. 11, 2015, which is incorporated by reference.

FIELD

The present disclosure relates generally to bipolar electrodialysis methods and systems for purifying organic acids.

BACKGROUND

The following paragraphs are not an admission that anything discussed in them is prior art or part of the knowledge of persons skilled in the art.

A bipolar electrodialysis cell refers to an electrodialysis cell that includes a bipolar membrane. The bipolar membrane disassociates water into hydronium ions and hydroxyl ions on application of an electrical field. These generated ions combine with cations and anions from a process stream that includes salts, where the cations and anions are separated by one or more ion exchange membranes in the electrodialysis cell. The combination of the hydronium ions with the anions, and the hydroxyl ions with the cations, results in produced streams having acid and base.

A bipolar electrodialysis cell may be a two-compartment cell or a three-compartment cell. A two-compartment cell includes either a cation-exchange membrane or an anion-exchange membrane between two bipolar membranes. The choice of using a cation-exchange membrane or an anion-exchange membrane depends on which salts are being processed. Cation-exchange membranes are used to process solutions having salts of weak acids and strong bases, such as sodium salts of organic and amino acids. Examples of such organic and amino acids include: ascorbic acid, acetic acid, lactic acid, formic acid, gluconic acid, and glutamic acid. Anion-exchange membranes are used to process solutions having salts of weak bases and strong or weak acids, such as ammonium salts of chloride, sulfate or lactate.

A three-compartment cell includes an anion-exchange membrane and a cation-exchange membrane between two bipolar membranes, thereby forming three compartments. The three compartments are: an acidic solution-producing compartment between the first bipolar membrane and the anion-exchange membrane; a basic solution-producing compartment between the second bipolar membrane and the cation-exchange membrane; and a compartment between the cation-exchange membrane and the anion-exchange membrane that produces a salt-reduced solution. A three-compartment BPED cell is used for recovering an inorganic acid and base from its corresponding salt.

INTRODUCTION

The following introduction is intended to introduce the reader to this specification but not to define any invention. One or more inventions may reside in a combination or sub-combination of the apparatus elements or method steps described below or in other parts of this document. The inventors do not waive or disclaim their rights to any invention or inventions disclosed in this specification merely by not describing such other invention or inventions in the claims.

Two-compartment bipolar electrodialysis (BPED) may be used to recover an organic acid from a solution of an organic acid salt, such as a sodium, potassium or ammonium salt of ascorbic acid (Vitamin C), acetic acid, formic acid, lactic acid, gluconic acid, glutamic acid, citric acid, propionic acid, salicylic acid, or amino acids. The organic acid salt is processed with a two-compartment BPED having a cation-exchange membrane between two bipolar membranes. In such a system, the organic acid anion combines with a hydrogen ion that is produced by one of the bipolar membranes and generates the organic acid. The organic acid cation is transported through the cation-exchange membrane to the adjacent compartment, where it generates a cation hydroxide with the hydroxide produced by the other of the bipolar membranes. As more of the organic acid salt is processed into the organic acid and the cation hydroxide, the current density decreases and the efficiency decreases. When the concentration of organic acid salt decreases to a point at which the current density makes it impractical to further purify the organic acid, the purification process is stopped. The purified organic acid may still contain a portion of organic acid salt. Further processing using an ion exchange column to transform at least some of the remaining organic acid salt into organic acid may be required to generate a solution with the desired purity of organic acid.

Additionally, a solution of an organic acid salt may need to be first purified and concentrated by electrodialysis or crystallization before being purified using two-compartment bipolar electrodialysis. This additional purification and concentration step is necessary when the organic acid salt solution is sufficiently dilute that the current density is impractically low. This first purification step is undesirable as it requires additional time or energy.

Three-compartment BPED may be used to purify a solution of an organic acid salt, such as those listed above. However, low dissociation and conductivity of an organic acid often results in impractically low current densities. Additionally, three-compartment BPED often suffers from co-ion leakage of cations across the bipolar membrane from the base-producing compartment to the acid-producing compartment. In methods where a sodium salt of an organic acid is being treated, this leakage of sodium ions across the bipolar membrane results in contamination of the organic acid-solution with the sodium salt of the organic acid. The contaminated organic acid-solution may be processed using an ion exchange column to transform at least some of the remaining organic acid salt into organic acid.

It is desirable to develop alternative methods and systems to purify a solution of an organic acid salt. One or more described examples may address or ameliorate one or more shortcomings involved with bipolar electrodialysis systems formed exclusively of two-compartment bipolar electrodialysis cells, or exclusively of three-compartment bipolar electrodialysis cells. Some of the alternative methods and systems may reduce or obviate the need for additional organic acid purification steps, such treatment with an ion-exchange resin. In comparison to known methods and system, some of these alternative methods and systems may have increased efficiency, may require less time to produce the same amount of organic acid, or both. Some of these alternative methods and systems may reduce the contamination of the purified organic acid-solution with cations.

In some examples according to the present disclosure, there is provided a bipolar electrodialysis system that includes at least one three-compartment bipolar electrodialysis cell, and at least one two-compartment bipolar electrodialysis cell. The three-compartment bipolar electrodialysis cell accepts a solution of an organic acid salt and produces a basic solution, an organic acid solution, and a salt-depleted solution. The produced solution of organic acid includes at least some organic acid salt. The two-compartment bipolar electrodialysis cell accepts the produced solution of organic acid, producing a basic solution and a more purified organic acid solution.

In specific examples, the at least one three-compartment bipolar electrodialysis cell and the at least one two-compartment bipolar electrodialysis cell are in the same electrodialysis stack. Using an electrodialysis system that includes both a three-compartment bipolar electrodialysis cell and a two-compartment bipolar electrodialysis cell in the same electrodialysis stack may reduce the amount of electrical energy needed to recover the organic acid when compared to using sequential three-compartment bipolar electrodialysis and two-compartment bipolar electrodialysis systems.

In electrodialysis stacks that include a plurality of bipolar electrodialysis cells, adjacent cells may share bipolar membranes. That is, the anode-side bipolar membrane of one electrodialysis cell may act as the cathode-side bipolar membrane of the directly adjacent electrodialysis cell.

In the context of the present disclosure, the term "purified" or "more purified" refers to a solution that has a lower concentration of organic acid salt than the feed solution. For example, a solution containing both an organic acid and an organic acid salt would be considered to be purified when compared to a feed solution that only included the organic acid salt. However, a solution that only contained an organic acid (with no organic acid salt) would be considered to be purified when compared to the solution containing both an organic acid and an organic acid salt.

In some exemplary systems according to the present disclosure, at least some of the acidic solution-producing compartments include cation- or anion-exchange resin. The cation- or anion-exchange resin may improve the conductivity of the liquid in the acidic solution-producing compartment. In specific exemplary systems, the resin is a cation-exchange resin in sodium form or $H^+$ form. In other exemplar systems, the resin is an anion-exchange resin in $OH^-$ form.

Systems according to the present disclosure may include three-compartment bipolar electrodialysis cells to two-compartment bipolar electrodialysis cells in a ratio from 1:1 to 20:1. In particular examples, the ratio is from 5:1 to 15:1. In specific exemplary systems, the ratio is from 5:1 to 10:1. Increasing the ratio of three-compartment bipolar electrodialysis cells to two-compartment bipolar electrodialysis cells to greater than 20:1 produces lower purity organic acid.

BRIEF DESCRIPTION OF THE DRAWINGS

Examples of the present disclosure will now be described with reference to the attached Figures.

DETAILED DESCRIPTION

Generally, the present disclosure provides a bipolar membrane electrodialysis method and system for recovering an organic acid from an aqueous solution containing the organic acid salt. The bipolar membrane electrodialysis system includes a bipolar membrane electrodialysis stack having at least one three-compartment bipolar electrodialysis cell, and a bipolar membrane electrodialysis stack having at least one two-compartment bipolar electrodialysis cell. The at least one three-compartment bipolar electrodialysis cell and the at least one two-compartment bipolar electrodialysis cell may be in the same electrodialysis stack.

The three-compartment bipolar electrodialysis cell accepts the aqueous solution containing the organic acid salt, producing a solution containing organic acid and a solution containing a base. The solution of organic acid is also passed through the two-compartment bipolar electrodialysis cell in order to remove at least a portion of the cations that leaked across the bipolar membrane into the acid-producing compartment of the three-compartment bipolar electrodialysis cell.

Figure 1:
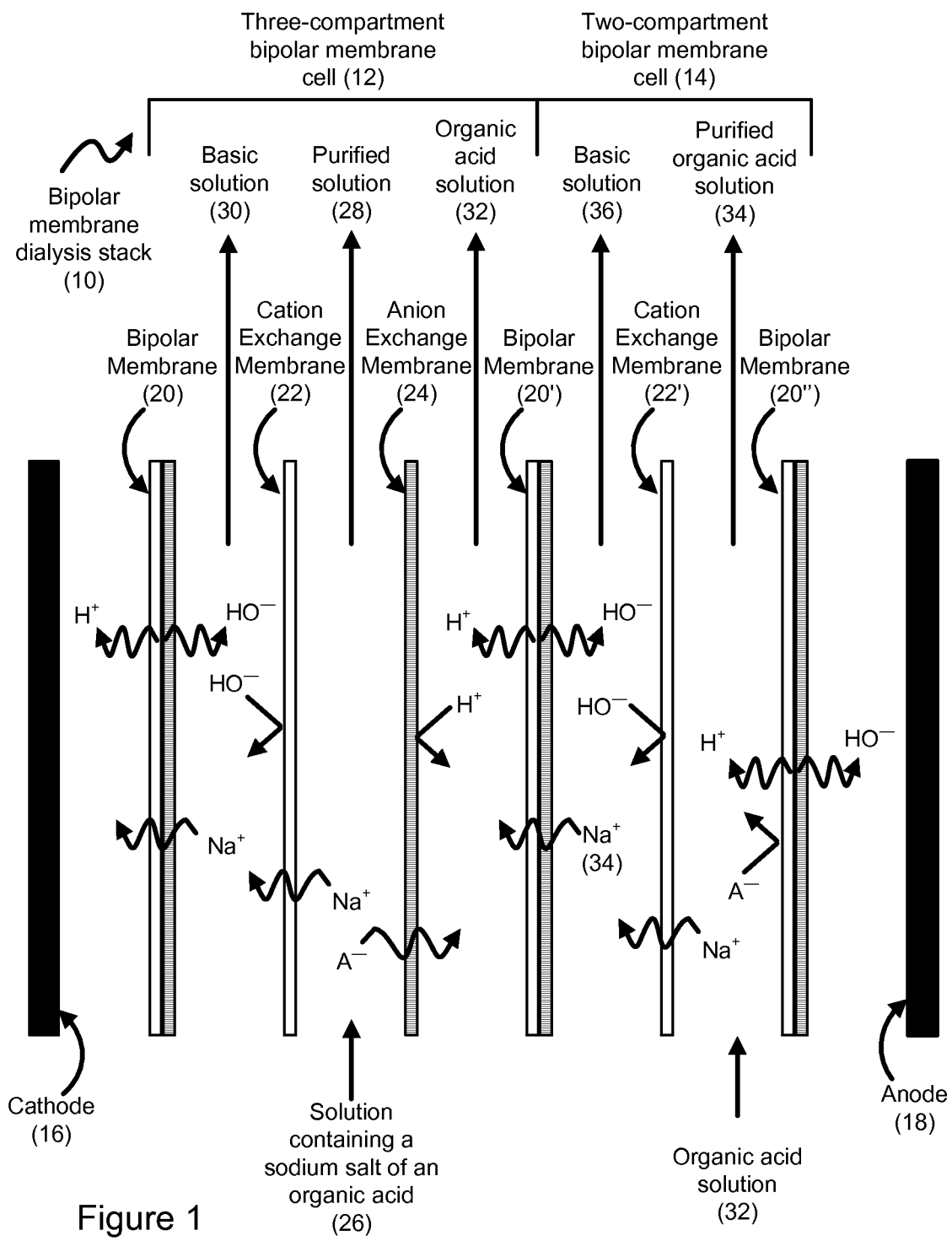
FIG. 1 is an illustration of a bipolar membrane electrodialysis stack according to the present disclosure.

FIG. 1 illustrates an example of a bipolar membrane electrodialysis stack (10) according to the present disclosure. The stack includes a three-compartment bipolar membrane cell (12) and a two-compartment bipolar membrane cell (14). In the electrodialysis system of FIG. 1, the two cells (12 and 14) are located in a single stack between a cathode (16) and an anode (18). The stack (10) includes bipolar membranes (20, 20', 20''), cation-exchange membranes (22, 22'), and anion-exchange membrane (24).

The three-compartment bipolar cell (12) accepts a feed solution containing a sodium salt of an organic acid (26). In an aqueous solution, the sodium salt of the organic acid dissociates into sodium ions ($Na^+$) and acid anions ($A^-$). The sodium ions and acid anions in the feed solution (26) are separated under the application of an electrical current as the sodium ions migrate towards the cathode (16) and pass through the cation exchange membrane (22); and as the acid anions migrate towards the anode (18) and pass through the anion exchange membrane (24). A solution having reduced organic acid salt concentration (28) is produced.

The bipolar membranes (20, 20') split water into hydronium ions ($H_3O^+$, illustrated in FIG. 1 as $H^+$) and hydroxide ions ($OH^-$). The hydroxide ions balance the charge of the sodium ions, and result in the production of a basic sodium hydroxide solution (30). The hydronium ions balance the charge of the acid anion ($A^-$) and result in the production of an organic acid solution (32).

The cation- and anion-exchange membranes (22, 24) define a compartment that accepts the organic acid salt solution and produces the solution having reduced organic acid salt concentration (28). The bipolar membrane (20) and the cation-exchange membrane (22) define a compartment that produces the basic solution (30). The anion-exchange membrane (24) and the bipolar membrane (20') define a compartment that produces the organic acid solution (32).

The organic acid solution (32) also includes a portion of the sodium salt of the organic acid since sodium ions may leak through the bipolar membrane (20'). These leaked sodium ions are identified in FIG. 1 as $Na^+$ (34).

The organic acid solution (32) is further purified in the two-compartment bipolar membrane cell (14) by feeding the organic acid solution (32) into the compartment defined by the cation exchange membrane (22') and the bipolar membrane (20"). The sodium ion present in the organic acid solution (32) migrates through the cation exchange membrane (22') on application of the electrical current, which is balanced out by the hydronium ion ($H_3O^+$) generated at the bipolar membrane (20"). This results in the production of a purified organic acid solution (34). The sodium ion that migrates through the cation exchange membrane (22') is balanced by the hydroxide ion produced at bipolar membrane (20'), resulting in the production of a second basic solution (36).

The organic acid solution (32) may be recycled to the bipolar membrane electrodialysis stack by being routed directly to the two-compartment bipolar membrane cell (14), or by being held in a holding tank (not shown) and subsequently passed through a two-compartment bipolar membrane cell of this or another bipolar membrane electrodialysis stack according to the present disclosure.

The membranes shown in FIG. 1 may be separated by spacers, not shown. Spacers separate adjacent membranes while still allowing the solutions to flow through the system. Spacers with tortuous structure, screen structure, or spacers filled with ion exchange resins may be used. The tortuous and screen spacers may be about 1/32" thick. The resin filled spacers may be from about 1/16" to about 1/8" thick. The spacers may have 4-inlets and 4-outlets. Spacers may be used in the two-compartment BPED cell, in the three-compartment BPED cell, or both.

Figure 2:
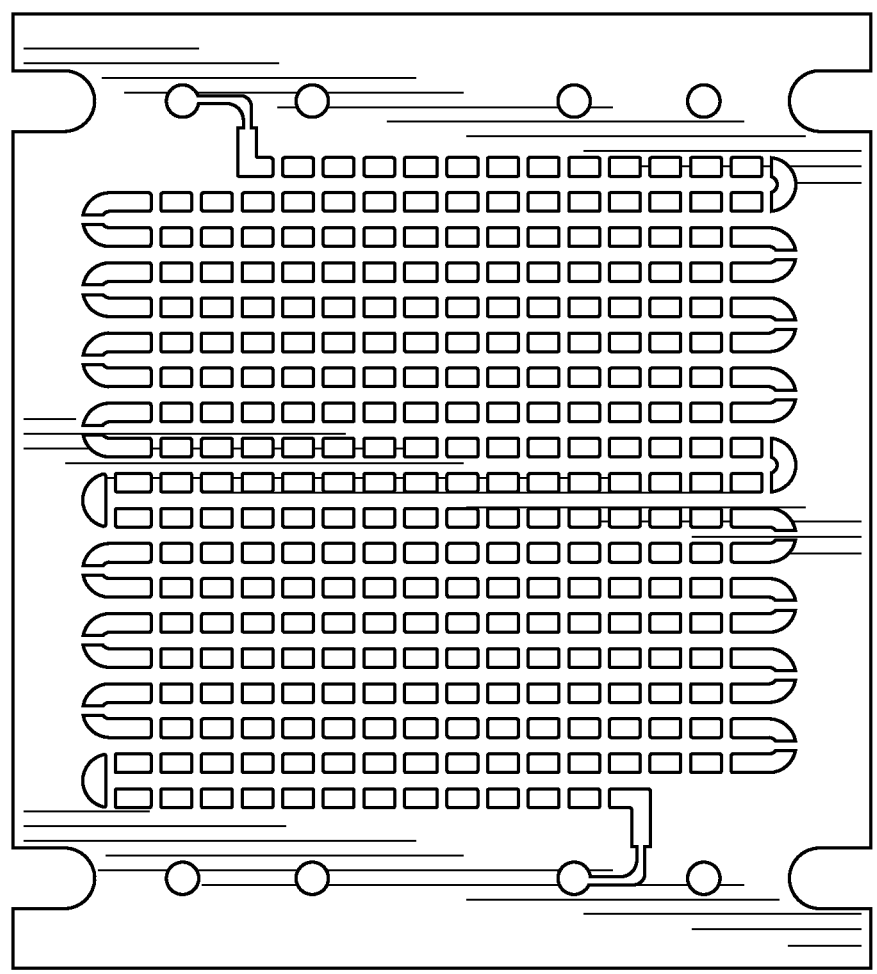
FIG. 2 is a photograph of an exemplary spacer that may be used in a bipolar electrodialysis cell.
Figure 3:
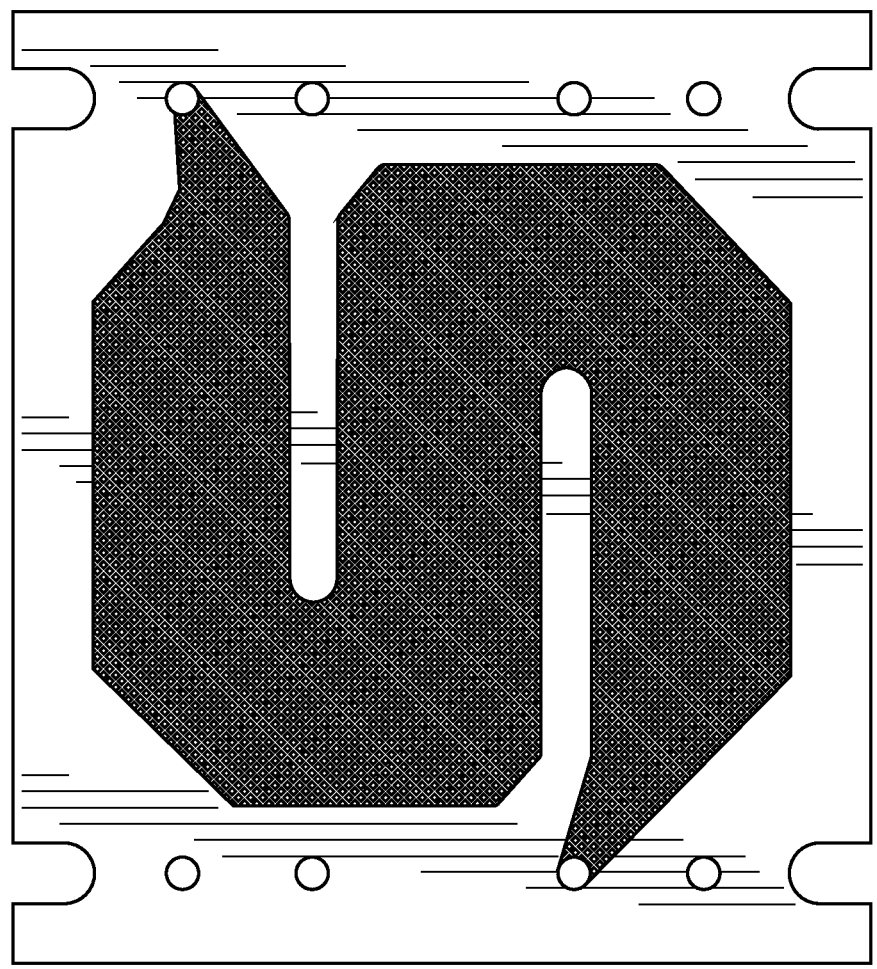
FIG. 3 is a photograph of an exemplary spacer that may be used in a bipolar electrodialysis cell.
Figure 4:
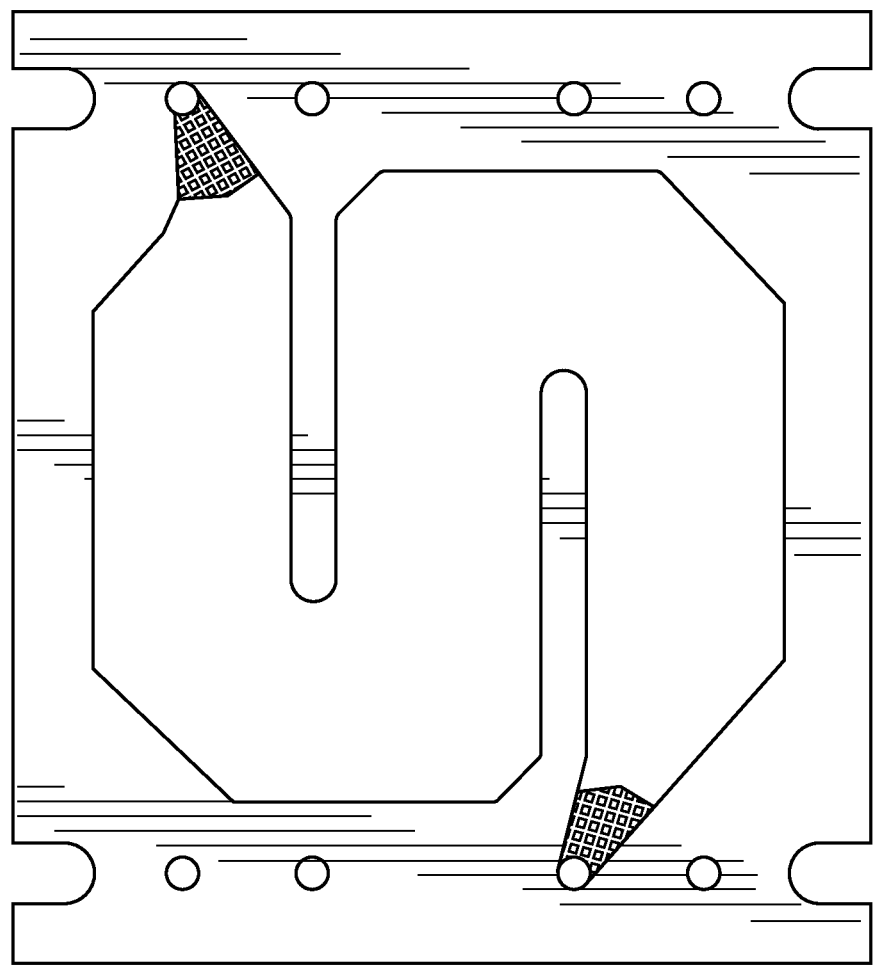
FIG. 4 is a photograph of an exemplary spacer that may be used in a bipolar electrodialysis cell.

Exemplary spacers are shown in FIGS. 2-4. FIG. 2 shows an exemplary spacer, originally produced in the 1980's, having a tortuous structure. FIG. 3 shows an exemplary screen spacer, originally produced in the 2000's, having an S-type structure. FIG. 4 shows an exemplary spacer, without a screen, for filling with an ion-exchange resin.

Although the stack illustrated in FIG. 1 shows only a single three-compartment bipolar membrane cell and a single two-compartment bipolar membrane cell, stacks according to the present disclosure may include a plurality of three-compartment bipolar membrane cells and a plurality of two-compartment bipolar membrane cells. For example, the stack may include from 1 to 20 three-compartment cells for every 1 two-compartment cell. The three-compartment bipolar membrane cells and the two-compartment bipolar membrane cells may be present in a ratio of 5:1 to 15:1. In specific exemplary systems, the ratio is from 5:1 to 10:1. A full size stack may include as many as 150 cell pairs, or more.

The cation-exchange membranes used in the electrodialysis stacks according to the present disclosure may be homogenous membranes having an ion exchange capacity of about 2.2 to about 2.4 meq/g, a water content of about 43 to about 49%, a thickness of about 0.55 to about 0.69 mm, a resistivity of about 10 to about 12 ohm-$cm^2$, and a Mullen burst strength of about 250 to about 350 psi. A representative example of useful cation-exchange membranes is sold under the trademark CR61CMP, available from GE Inc. The cation-exchange membranes used in an electrodialysis stack may, or may not, be all identical. The anion-exchange membranes used in the electrodialysis stacks according to the present disclosure may be homogenous membranes having an ion exchange capacity of about 2.0 to about 2.2 meq/g, a water content of about 33 to about 39%, a thickness of about 0.55 to about 0.69 mm, a resistivity of about 11 to about 14 ohm-$cm^2$, and a Mullen burst strength of about 250 to about 350 psi. A representative example of useful anion-exchange membranes is sold under the trademark AR103QDP, available from GE Inc. The anion-exchange membranes used in an electrodialysis stack may, or may not, be all identical. The bipolar electrodialysis membranes used in the electrodialysis stacks according to the present disclosure consist of an anion exchange layer with catalyst bonded to a cation exchange layer. A representative example of useful bipolar membranes is sold under the trademark BtB BP, available from GE. The bipolar electrodialysis membranes used in an electrodialysis stack may, or may not, be all identical.

Other membranes than those listed above may be used. However, the membranes are preferably stable to acid and caustic solution up to about 4 N. The membranes are preferably homogeneous membranes since homogeneous membranes have a lower resistance than heterogeneous membranes.

Including a cation- or anion-exchange resin in an acid compartment of a cell may improve the conductivity of the liquid in the compartment. This is especially beneficial when purifying acids having a pKa greater than about 1.5 since aqueous solutions of such acids dissociate to generate concentrations of hydronium ions and conjugate base that result in current densities that make purification impractical. Systems according to the present disclosure may include a cation- or anion-exchange resin in at least some of the acidic solution-producing compartments, for example in the compartments that produce organic acid solution (32) and the compartments that produce purified organic acid solution (34). Including ion-exchange resins in at least some of the acidic solution-producing compartments increases the current density of the stack.

The resin may be a cation-exchange resin in sodium form or $H^+$ form, or may be an anion-exchange resin in $OH^-$ form. The ion-exchange resin is preferably strongly acidic cation-exchange resin. Specific examples of resins that may be used in electrodialysis stacks according to the present disclosure include: Dowex Monosphere 650C(H) (a styrene-divinyl benzene (DVB) cation-exchange gel with a sulfonic acid functional group in $H^+$ form) from DOW company, and Dowex Monosphere 550A(OH) (a styrene-divinyl benzene (DVB) anion-exchange gel with a quaternary amine functional group in $OH^-$ form) from DOW company. Dowex Monosphere 650C(H) are spherical cation-exchange resin beads having a volume capacity of 2.0 eq/L, a harmonic mean diameter of 650±50 µm, an ionic conversion of 99.7%. The resin may be regenerated using 1-10% $H_2SO_4$ or 4-8% HCl. Dowex Monosphere 550A(OH) are spherical anion-exchange resin beads having a volume capacity of 1.1 eq/L, a harmonic mean diameter of 590±50 µm, an ionic conversion of 94% for $OH^-$. The resin may be regenerated using 4-8% NaOH.

Electrodialysis devices according to the presently disclosure may include any known electrodes for the anode and cathode. The anode may include titanium/platinum, carbon, nickel, ruthenium/titanium, or iridium/titanium. The anode may be a dimensionally stable anode, such as a titanium plate or mesh coated with mixed metal oxides (MMO), such as $RuO_2$, $IrO_2$, $TiO_2$ and $Ta_2O_5$. The cathode may include iron, nickel, platinum, titanium/platinum, carbon, or stainless steel. The structure of the electrodes may be any known structures. Examples of the general structure include a flat plate shaped structure, a mesh-shaped structure, and a lattice-shaped structure.

A 9"×10" bipolar electrodialysis stack according to the present disclosure, having 5 three-component bipolar electrodialysis cells and 1 two-component bipolar electrodialysis cell, may be operated with a current density of about 30 to about 100 mA/$cm^2$ at a cell voltage from about 2 to about 4 V/cell when purifying acetic acid from a solution of sodium acetate. Stacks according to the present disclosure are preferably operated at an operation temperature of below about 50° C., a flow linear velocity of about 5 to about 20 cm/sec, and a flow pressure of about 3 to about 15 psi. Such an exemplary stack includes cation-exchange resin in the acidic-solution producing compartments. In the exemplary stack, the resin is held in place using a spacer formed from about ¹⁄₁₆" or about ⅛" thick low-density polyethylene (LPDE), which is sandwiched between the two membranes.

An electrodialysis system that included the exemplary 9"×10" stack described above, but without resin in the acidic-solution producing compartments, was tested against an electrodialysis system that included only 6 three-compartment bipolar electrodialysis cells. The systems were used to purify a sodium acetate solution. A summary of the runs and the composition of the purified solutions are shown below:

|  | Run #2 | Run #3 |
|---|---|---|
| Configuration | 6 3-C | 5 3-C, 1 2-C |
| Feed (equilibrium) | 3.66 | 3.66 |
| Acid produced (equilibrium) | 2.46 | 2.851 |
| Base produced (equilibrium) | 2.59 | 2.391 |
| Run (min) | 150 | 180 |
| Faraday (equilibrium) | 4.63 | 4.60 |
| Current efficiency %, acid | 57.7 | 42.0 |
| Power consumption, acid (kwh/kg) | 1.795 | 3.155 |
| Current efficiency %, base | 56.3 | 52.0 |
| Power consumption, base (kwh/kg) | 2.759 | 3.831 |
| Sodium (ppm) | 1090 | 192 |
| Acetic Acid (ppm) | 79,600 | 80,700 |
| Sodium (moles/L) | 0.0474 | 0.0083 |
| Acetic Acid (moles/L) | 1.327 | 1.345 |
| Sodium (mol %) | 3.57 | 0.62 |
| Sodium (wt %) | 1.37 | 0.24 |
| Final acid conductivity (mS/cm) | 5.58 | 2.63 |

One can see that sodium ion is reduced from 1090 ppm in Run #2 to 192 ppm in Run #3, corresponding to a reduction in weight % of sodium from 1.37% to 0.24%.

Run #2 corresponds to the purified solutions produced by the electrodialysis system that included only 6 three-compartment bipolar electrodialysis cells. Run #3 corresponds to the purified solution produced by the electrodialysis system that included 5 three-component bipolar electrodialysis cells and 1 two-component bipolar electrodialysis cell.

Power consumption for purification of acetic acid from sodium acetate was compared between an electrodialysis system that included resin cation-exchange resin Dowex 650 (H⁺) in the acidic-solution producing compartments, and an electrodialysis system that did not include resin. Both systems had 5 three-component bipolar electrodialysis cells and 1 two-component bipolar electrodialysis cell. Run #3, as noted above, corresponds to the system without resin, while Run #9 corresponds to the system with resin. A summary of the runs and the composition of the purified solutions are shown below:

|  | Run #3 | Run #9 |
|---|---|---|
| Configuration | 5 3-C, 1 2-C | 5 3-C, 1 2-C with cation exchange resin |
| Feed (equilibrium) | 3.66 | 3.66 |
| Acid produced (equilibrium) | 2.851 | 2.46 |
| Base produced (equilibrium) | 2.391 | 2.59 |
| Run (min) | 180 | 160 |
| Faraday (equilibrium) | 4.60 | 4.96 |
| Current efficiency %, acid | 42.0 | 49.6 |
| Power consumption, acid (kwh/kg) | 3.155 | 2.108 |
| Current efficiency %, base | 52.0 | 52.2 |
| Power consumption, base (kwh/kg) | 3.831 | 3.001 |
| Sodium (ppm) | 192 | 158 |
| Acetic Acid (ppm) | 80,700 | 71,800 |
| Sodium (moles/L) | 0.0083 | 0.0069 |
| Acetic Acid (moles/L) | 1.345 | 1.197 |
| Sodium (mol %) | 0.62 | 0.58 |
| Sodium (wt %) | 0.24 | 0.22 |
| Final acid conductivity (mS/cm) | 2.63 | 2.35 |

One can see that power consumption is reduced from 3.155 kwh/kg of acetic acid in Run #3 to 2.108 kwh/kg in Run #9, which includes cation-exchange resin in the acidic-solution producing compartment.

In the preceding description, for purposes of explanation, numerous details are set forth in order to provide a thorough understanding of the examples. However, it will be apparent to one skilled in the art that these specific details are not required. Accordingly, what has been described is merely illustrative of the application of the described examples and numerous modifications and variations are possible in light of the above teachings.

Since the above description provides exemplary examples, it will be appreciated that modifications and variations can be effected to the particular examples by those of skill in the art. Accordingly, the scope of the claims should not be limited by the particular examples set forth herein, but should be construed in a manner consistent with the specification as a whole.

What is claimed is:

1. A system for producing a purified solution that includes an organic acid from a feed solution that includes a salt of the organic acid, the system comprising:
   an anode;
   a cathode; and
   at least one three-compartment bipolar membrane electrodialysis cell for accepting the feed solution and for producing an organic acid containing solution; and
   at least one two-compartment bipolar membrane electrodialysis cell configured to accept the organic acid containing solution and for producing the purified solution containing the organic acid;
   wherein the purified solution containing the organic acid has a lower concentration of the organic acid salt than the organic acid containing solution does.

2. The system according to claim 1, wherein the at least one three-compartment bipolar membrane electrodialysis cell and the at least two-compartment bipolar membrane electrodialysis cell are in a single bipolar membrane electrodialysis stack.

3. The system according to claim 2, wherein the single bipolar membrane electrodialysis stack is between the anode and the cathode.

4. The system according to claim 1, wherein the system includes three-compartment bipolar membrane electrodialysis cells and two-compartment bipolar membrane electrodialysis cells in a ratio of 1:1 to 20:1.

5. The system according to claim 4, wherein the system includes three-compartment bipolar membrane electrodialysis cells and two-compartment bipolar membrane electrodialysis cells in a ratio of 5:1 to 10:1.

6. The system according to claim 1, wherein the electrodialysis cells comprise acidic-solution producing compartments that include a cation-exchange resin or an anion-exchange resin.

7. The system according to claim 6, wherein the cation-exchange resin is in H+ form, or is in Na+ form.

8. The system according to claim 6, wherein the cation-exchange resin is a strongly acidic cation-exchange resin.

9. The system according to claim 6, wherein the anion-exchange resin is in OH− form.

10. The system according to claim 6, wherein the anion-exchange resin is a styrene-DVB gel with a quaternary amine functional group in OH− form.

11. The system according to claim 1 further comprising a processing system adapted to transport the organic acid containing solution from the at least one three-compartment bipolar membrane electrodialysis cell to the at least one two-compartment bipolar membrane electrodialysis cell.

12. The system according to claim 1, wherein the anode is titanium coated with platinum.

13. The system according to claim 1, wherein the cathode is stainless steel.

14. A bipolar membrane electrodialysis stack comprising:
   at least one three-compartment bipolar membrane electrodialysis cell; and
   at least one two-compartment bipolar membrane electrodialysis cell.

15. The bipolar membrane electrodialysis stack according to claim 14, wherein at least some of the electrodialysis cells comprise acidic-solution producing compartments that include a strongly acidic cation-exchange resin.

* * * * *